US012362903B2

(12) United States Patent
Papadimitriou et al.

(10) Patent No.: US 12,362,903 B2
(45) Date of Patent: Jul. 15, 2025

(54) RNS-BASED CKKS VARIANT WITH MINIMAL RESCALING ERROR

(71) Applicant: Duality Technologies, Inc., Maplewood, NJ (US)

(72) Inventors: Antonis Papadimitriou, Harrison, NJ (US); Yuriy Polyakov, Fair Lawn, NJ (US)

(73) Assignee: Duality Technologies, Inc., Maplewood, NJ (US)

( * ) Notice: Subject to any disclaimer, the term of this patent is extended or adjusted under 35 U.S.C. 154(b) by 320 days.

(21) Appl. No.: 17/851,694

(22) Filed: Jun. 28, 2022

(65) Prior Publication Data

US 2023/0012099 A1  Jan. 12, 2023

Related U.S. Application Data

(60) Provisional application No. 63/216,041, filed on Jun. 29, 2021.

(51) Int. Cl.
*H04L 9/00* (2022.01)
*H04L 9/06* (2006.01)

(52) U.S. Cl.
CPC ............. *H04L 9/008* (2013.01); *H04L 9/0618* (2013.01)

(58) Field of Classification Search
CPC ............................. H04L 9/008; H04L 9/0618
USPC ........................................................... 380/28
See application file for complete search history.

(56) References Cited

U.S. PATENT DOCUMENTS

| 6,128,386 | A  | * | 10/2000 | Satterfield | ............. | H04L 9/0656 |
|---|---|---|---|---|---|---|
|  |  |  |  |  |  | 380/42 |
| 6,910,097 | B1 | * | 6/2005 | Srinivasan | ............. | H04L 45/00 |
|  |  |  |  |  |  | 711/108 |
| 10,075,288 | B1 | * | 9/2018 | Khedr | ..................... | H04L 9/008 |
| 10,853,502 | B1 | * | 12/2020 | Wu | ........................ | H04L 9/0618 |
| 11,277,256 | B2 | * | 3/2022 | Kim | ....................... | H04L 9/008 |
| 11,849,019 | B2 | * | 12/2023 | Fukuda | ................... | H04L 9/008 |
| 2012/0113068 | A1 | * | 5/2012 | Chen | .................... | G09G 3/3677 |
|  |  |  |  |  |  | 345/204 |

(Continued)

OTHER PUBLICATIONS

Cheon, J. H., Kim, A., Kim, M., & Song, Y. (Dec. 2017). Homomorphic encryption for arithmetic of approximate numbers. In *International Conference on the Theory and Application of Cryptology and Information Security* (pp. 409-437). Springer, Cham.

(Continued)

*Primary Examiner* — Dant B Shaifer Harriman
(74) *Attorney, Agent, or Firm* — PEARL COHEN ZEDEK LATZER BARATZ LLP

(57) ABSTRACT

Methods and systems for reducing noise in homomorphic multiplication include: receiving a plurality of ciphertexts, each having a corresponding level; receiving data specifying a homomorphic multiplication on two ciphertexts; for two ciphertexts having different levels: adjusting a scaling factor of a first ciphertext so that the respective scaling factors of the two ciphertexts are the same; performing the homomorphic multiplication; and rescaling a result of the homomorphic multiplication; for two ciphertexts having the same level: performing the homomorphic multiplication; rescaling a result of the homomorphic multiplication; and using the scaling factors of the two ciphertexts during a decryption process.

12 Claims, 6 Drawing Sheets

(56) References Cited

U.S. PATENT DOCUMENTS

| | | | | |
|---|---|---|---|---|
| 2013/0216044 A1* | 8/2013 | Gentry | .................... | H04L 9/008 |
| | | | | 380/277 |
| 2015/0358153 A1* | 12/2015 | Gentry | ................. | H04L 9/3093 |
| | | | | 380/30 |
| 2018/0091301 A1* | 3/2018 | Nuñez | .................... | H04L 9/3228 |
| 2019/0363871 A1* | 11/2019 | Cheon | .................... | H04L 9/304 |
| 2019/0394019 A1* | 12/2019 | Gao | ........................ | H04L 9/008 |
| 2020/0374103 A1* | 11/2020 | Cheon | .................... | G06F 7/722 |
| 2021/0297232 A1* | 9/2021 | Kim | ...................... | H04L 9/0618 |
| 2024/0106632 A1* | 3/2024 | No | ......................... | G06F 7/523 |

OTHER PUBLICATIONS

Cheon, J. H., Han, K., Kim, A., Kim, M., & Song, Y. (Aug. 2018). A full RNS variant of approximate homomorphic encryption. In *International Conference on Selected Areas in Cryptography* (pp. 347-368). Springer, Cham.

Blatt, M., Gusev, A., Polyakov, Y., Rohloff, K., & Vaikuntanathan, V. (2019). Optimized Homomorphic Encryption Solution for Secure Genome-Wide Association Studies. *IACR Cryptology ePrint Archive*, 2019, 223.

\* cited by examiner

```
┌─────────────────────────────────┐
│ RECEIVING A PLURALITY OF        │
│ CIPHERTEXTS, WHEREIN EACH       │
│ CIPHERTEXT HAS A                │  202
│ CORRESPONDING LEVEL OF A        │
│ PLURALITY OF LEVELS             │
└─────────────────────────────────┘
                 │
┌─────────────────────────────────┐
│ RECEIVING DATA SPECIFYING       │
│ A HOMOMORPHIC                   │
│ MULTIPLICATION OPERATION TO     │  204
│ BE PERFORMED ON TWO             │
│ CIPHERTEXTS OF THE PLURALITY    │
│ OF CIPHERTEXTS                  │
└─────────────────────────────────┘
                 │
┌─────────────────────────────────┐
│ FOR TWO CIPHERTEXTS HAVING      │
│ DIFFERENT CORRESPONDING         │
│ LEVELS:                         │
│ ADJUSTING A SCALING FACTOR      │
│ OF A FIRST CIPHERTEXT OF THE    │  206
│ TWO CIPHERTEXTS SO THAT THE     │
│ RESPECTIVE SCALING FACTORS      │
│ OF THE TWO CIPHERTEXTS ARE      │
│ THE SAME                        │
└─────────────────────────────────┘
                 │
┌─────────────────────────────────┐
│ FOR TWO CIPHERTEXTS HAVING      │
│ DIFFERENT CORRESPONDING         │
│ LEVELS:                         │
│ PERFORMING THE SPECIFIED        │
│ HOMOMORPHIC MULTIPLICATION      │  208
│ OPERATION ON THE ADJUSTED       │
│ FIRST CIPHERTEXT AND A SECOND   │
│ CIPHERTEXT OF THE TWO           │
│ CIPHERTEXTS                     │
└─────────────────────────────────┘
```

Fig. 2 (Cont.)

FOR TWO CIPHERTEXTS HAVING DIFFERENT CORRESPONDING LEVELS: RESCALING A RESULT OF THE SPECIFIED HOMOMORPHIC MULTIPLICATION OPERATION — 210

FOR TWO CIPHERTEXTS HAVING THE SAME CORRESPONDING LEVELS: PERFORMING THE SPECIFIED HOMOMORPHIC MULTIPLICATION OPERATION ON THE TWO CIPHERTEXTS — 212

FOR TWO CIPHERTEXTS HAVING THE SAME CORRESPONDING LEVELS: RESCALING A RESULT OF THE SPECIFIED HOMOMORPHIC MULTIPLICATION OPERATION — 214

FOR TWO CIPHERTEXTS HAVING THE SAME CORRESPONDING LEVELS: USING THE SCALING FACTORS OF THE TWO CIPHERTEXTS DURING A DECRYPTION PROCESS. — 216

RNS-BASED CKKS VARIANT WITH MINIMAL RESCALING ERROR

CROSS-REFERENCE TO RELATED APPLICATIONS

This application claims the benefit of and priority to U.S. Provisional Patent Application No. 63/216,041 filed Jun. 29, 2021, which is owned by the assignee of the instant application and incorporated herein by reference in its entirety.

FIELD OF THE INVENTION

The invention relates generally to reducing errors arising from homomorphic operations performed on homomorphically encrypted data.

BACKGROUND

Cheon, Kim, Kim and Song (CKKS) homomorphic encryption is a homomorphic encryption scheme suited for approximate real-number computations.

CKKS is a homomorphic encryption scheme that can support arithmetic operations (e.g., addition and multiplication) directly on encrypted data. For example, if $c_1$ is a ciphertext resulting from the encryption $Enc(x_1)$ of number $x_1$, and $c_2$ is a corresponding ciphertext from $Enc(x_2)$ then CKKS can have operations EvalAdd and EvalMult, which can take $c_1$ and $c_2$ as inputs, and return a third ciphertext $c_3$, which can decrypt to $(x_1+x_2)$ and $(x_1 \cdot x_2)$, respectively.

CKKS can pack a vector of multiple numbers into a single ciphertext and/or supports pointwise addition and/or multiplication operations to, for example, improve performance. Packing a vector can be done via "packed" encoding, which in addition to homomorphic encryption operation EvalAdd and homomorphic encryption operation EvalMult, can also support homomorphic cyclical rotations (e.g., EvalRotate) of elements in the encrypted vector.

Practical instantiations of the CKKS scheme may be built using lattice cryptography whose security can be based on a hardness of the ring-based variant of the learning with errors problem (RLWE). Under this setup, security can be achieved by adding small, independent Gaussian noise $e_i$ to all elements of a vector encrypted in a CKKS ciphertext.

SUMMARY

According to one or more embodiments, there is provided a method for reducing noise in homomorphic operations on ciphertext data, the method including: receiving a plurality of ciphertexts, wherein each ciphertext has a corresponding level of a plurality of levels; receiving data specifying a homomorphic multiplication operation to be performed on two ciphertexts of the plurality of ciphertexts; for two ciphertexts having different corresponding levels: adjusting a scaling factor of a first ciphertext of the two ciphertexts so that each respective scaling factor of the two ciphertexts is the same; performing the specified homomorphic multiplication operation on the adjusted first ciphertext and a second ciphertext of the two ciphertexts; and rescaling a result of the specified homomorphic multiplication operation; for two ciphertexts having the same corresponding levels: performing the specified homomorphic multiplication operation on the two ciphertexts; rescaling a result of the specified homomorphic multiplication operation; and using the scaling factors of the two ciphertexts during a decryption process.

According to some embodiments the step of adjusting a scaling factor of a first ciphertext of the two ciphertexts includes adjusting the scaling factor of the ciphertext with the highest corresponding level among corresponding levels of the two ciphertexts.

According to some embodiments, the scaling factor of a ciphertext having corresponding level i of the plurality of levels is given by $SF_i$ and the scaling factor of level i−1 is defined recursively as $$SF_{i-1} = \frac{SF_i^2}{q_i},$$

wherein the $q_i$ are the prime towers of a residue number system (RNS) used in an encryption of the ciphertext.

According to some embodiments, $SF_l$, the scaling factor of the highest corresponding level l, is equal to $2^p$ for some predefined $p \in \mathbb{Z}$.

According to some embodiments, $SF_l$, the scaling factor of the highest corresponding level l, is equal to $q_l$.

According to some embodiments, adjusting the scaling factor of the first ciphertext of the two ciphertexts includes multiplying the first ciphertext by an adjustment factor, wherein the adjustment factor $a_{adj}$ for scaling factor $SF_k$ is equal to:

$$a_{adj} = \frac{q_k \cdot SF_{k-i}}{SF_k^2}$$

when k−i is the corresponding level of the second ciphertext of the two ciphertexts.

According to some embodiments rescaling a resulting ciphertext of the specified homomorphic multiplication operation includes using a rescaling operation given by $$c' = \lfloor q_l^{-1} \cdot c \rceil \left( \mod \frac{Q_l}{q_l} \right)$$

wherein c is a resulting ciphertext of the specified homomorphic multiplication operation to be rescaled, c' is a rescaled ciphertext, and $Q_l = \Pi_{i=0}^{l} q_i$ is a ciphertext modulus, which is a product of all prime numbers $q_i$ that comprise a residue number system (RNS) used in an encryption of the plurality of ciphertexts.

According to one or more embodiments, there is provided a method for choosing residue number system moduli includes: receiving an n, an L and a p; setting a $q_L$ as the first prime number occurring between n and p; setting a $q_{next}$ equal to $q_L$; setting a $q_{prev}$ equal to $q_L$; setting an $sf_L$ equal to $q_L$; setting an $sf_{L-1}$ equal to $q_L$; setting a ctr equal to 0; for each of an i=L−2, . . . , 1: setting $sf_i$ equal to $$\frac{(sf_{i+1})^2}{q_{i+1}};$$

for ctr mod 2 equal to 0: updating $q_{prev}$ to equal $\lfloor sf_i \rceil - 2n - \lfloor \lfloor sf_i \rceil \rfloor_{2n} + 1$; setting a $q_i$ equal to the previous prime number occurring outside the range $q_{prev}$ to n; for ctr mod 2 different from 0: updating $q_{next}$ to equal $\lfloor sf_i \rceil + 2n - \lfloor \lfloor sf_i \rceil \rfloor_{2n} + 1$; setting a $q_i$ equal to the next prime number occurring inside the range $q_{next}$ to n; updating ctr=ctr+1; setting $q_0$ equal to the previous prime number occurring outside the range $p_0$ to n, wherein $p_0$ is a predefined value greater than p; and returning a value of q, wherein the value of q is a product of each $q_i$.

According to some embodiments, $p_0$ is based on a native word length of a computer processor.

According to some embodiments, the plurality of ciphertexts are encrypted using residue number system moduli generated by one or more other embodiments.

According to one or more embodiments, there is provided a system for reducing noise in homomorphic operations on ciphertext data, the system comprising at least one processor and a memory containing instructions which, when executed by the at least one processor, cause the at least one processor to: receive a plurality of ciphertexts, wherein each ciphertext has a corresponding level of a plurality of levels; receive data specifying a homomorphic multiplication operation to be performed on two ciphertexts of the plurality of ciphertexts; for two ciphertexts having different corresponding levels: adjust a scaling factor of a first ciphertext of the two ciphertexts so that each respective scaling factor of the two ciphertexts is the same; perform the specified homomorphic multiplication operation on the adjusted first ciphertext and a second ciphertext of the two ciphertexts; and rescale a result of the specified homomorphic multiplication operation; for two ciphertexts having the same corresponding levels: perform the specified homomorphic multiplication operation on the two ciphertexts; rescale a result of the specified homomorphic multiplication operation; and use the scaling factors of the two ciphertexts during a decryption process.

According to some embodiments the at least one processor is configured to adjust the scaling factor of the ciphertext with the highest corresponding level among corresponding levels of the two ciphertexts.

According to some embodiments, the scaling factor of a ciphertext having corresponding level i of the plurality of levels is given by $SF_i$ and the scaling factor of level i−1 is defined recursively as $$SF_{i-1} = \frac{SF_i^2}{q_i},$$

wherein the $q_i$ are the prime towers of a residue number system (RNS) used in an encryption of the ciphertext.

According to some embodiments, $SF_l$, the scaling factor of the highest corresponding level l, is equal to $2^p$ for some predefined $p \in \mathbb{Z}$.

According to some embodiments, $SF_l$, the scaling factor of the highest corresponding level l, is equal to $q_l$.

According to some embodiments, adjusting the scaling factor of the first ciphertext of the two ciphertexts includes multiplying the first ciphertext by an adjustment factor, wherein the adjustment factor $a_{adj}$ for scaling factor $SF_k$ is equal to:

$$a_{adj} = \frac{q_k \cdot SF_{k-i}}{SF_k^2}$$

when k−i is the corresponding level of the second ciphertext of the two ciphertexts.

According to some embodiments, the at least one processor is configured to rescale a resulting ciphertext of the specified homomorphic multiplication operation using a rescaling operation given by $$c' = \lfloor q_i^{-1} \cdot c \rceil \left( \mathrm{mod}\, \frac{Q_l}{q_l} \right)$$

wherein c is a resulting ciphertext of the specified homomorphic multiplication operation to be rescaled, c' is a rescaled ciphertext, and $Q_l = \Pi_{i=0}^{l} q_i$ is a ciphertext modulus, which is a product of all prime numbers $q_i$ that comprise a residue number system (RNS) used in an encryption of the plurality of ciphertexts.

According to one or more embodiments, there is provided a system for choosing residue number system moduli, the system comprising at least one processor and a memory containing instructions which, when executed by the at least one processor, cause the at least one processor to: receive an n, an L and a p; setting a $q_L$ as the first prime number occurring between n and p; set a $q_{next}$ equal to $q_L$; set a $q_{prev}$ equal to $q_L$; set an $sf_L$ equal to $q_L$; set an $sf_{L-1}$ equal to $q_L$; set a ctr equal to 0; for each of an i=L−2, . . . , 1: set $sf_i$ equal to $$\frac{(sf_{i+1})^2}{q_{i+1}};$$

for ctr mod 2 equal to 0: update $q_{prev}$ to equal $\lfloor sf_i \rceil - 2n - \lfloor \lfloor sf_i \rceil \rfloor_{2n} + 1$; set a $q_i$ equal to the previous prime number occurring outside the range $q_{prev}$ to n; for ctr mod 2 different from 0: updating $q_{next}$ to equal $\lfloor sf_i \rceil + 2n - \lfloor \lfloor sf_i \rceil \rfloor_{2n} + 1$; set a $q_i$ equal to the next prime number occurring inside the range $q_{next}$ to n; update ctr=ctr+1; set $q_0$ equal to the previous prime number occurring outside the range $p_0$ to n, wherein $p_0$ is a predefined value greater than p; and return a value of q, wherein the value of q is a product of each $q_i$.

According to some embodiments, $p_0$ is based on a native word length of the at least one processor.

According to some embodiments, the plurality of ciphertexts are encrypted using residue number system moduli generated by one or more other embodiments.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, may be understood by reference to the following detailed description when read with the accompanied drawings. Embodiments are illustrated without limitation in the figures, in which like reference numerals indicate corresponding, analogous, or similar elements, and in which:

FIG. 2 is a flowchart of a method, according to some embodiments of the invention;

Figure 1:
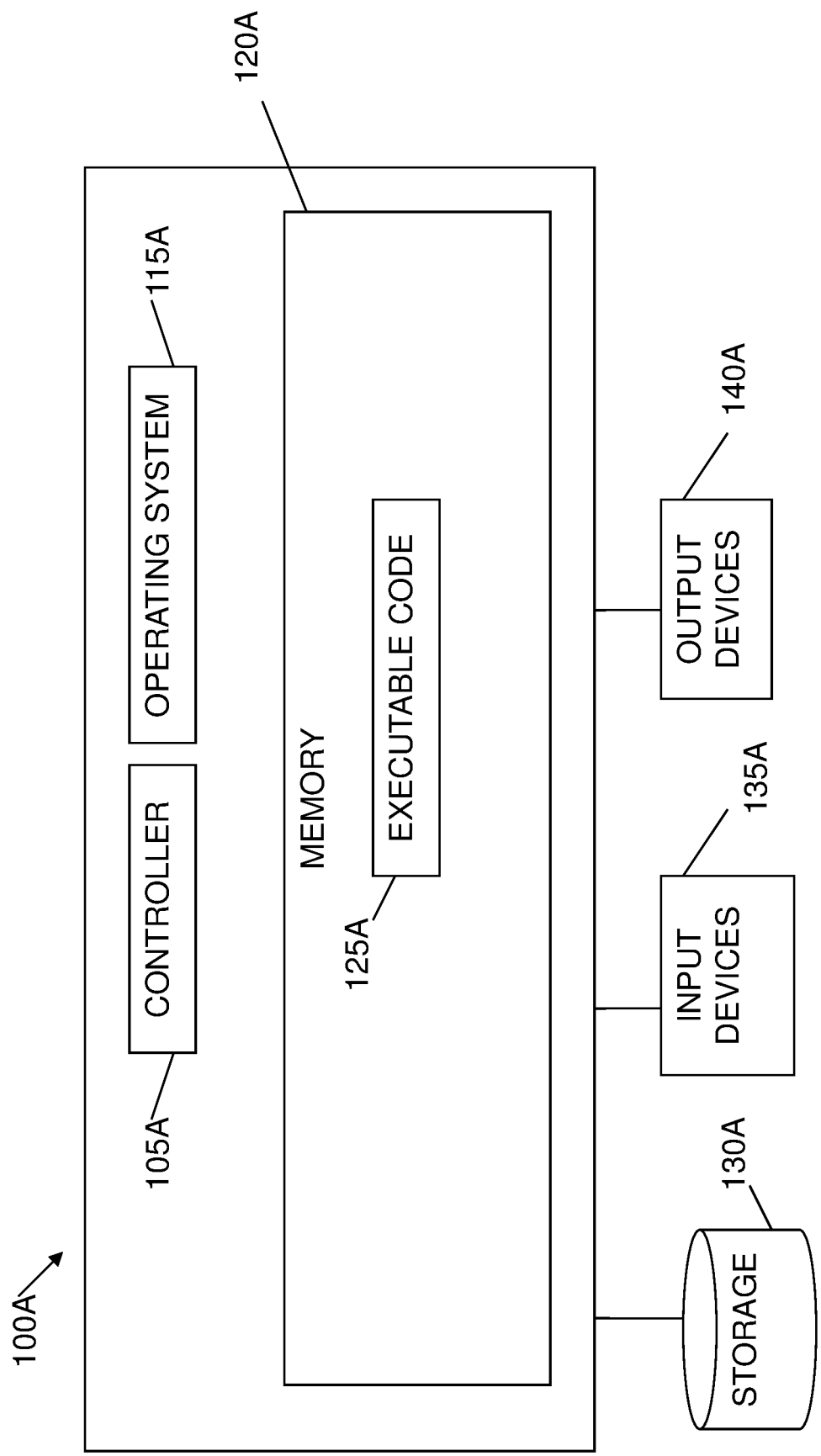
FIG. 1 is a block diagram of an exemplary computing device which may be used with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In general, embodiments of the invention can provide a CKKS-RNS algorithm which can eliminate or reduce an approximation error of rescaling and/or can achieve good performance and/or high accuracy. Embodiments of the CKKS-RNS algorithm may be referred to as "CKKS-RNS-EXACT".

FIG. 1 shows a block diagram of an exemplary computing device which may be used with embodiments of the present invention. Computing device 100A may include a controller or computer processor 105A that may be, for example, a central processing unit processor (CPU), a chip or any suitable computing device, an operating system 115A, a memory 120A, a storage 130A, input devices 135A and output devices 140A such as a computer display or monitor displaying for example a computer desktop system.

Operating system 115A may be or may include code to perform tasks involving coordination, scheduling, arbitration, or managing operation of computing device 100A, for example, scheduling execution of programs. Memory 120A may be or may include, for example, a Random Access Memory (RAM), a read only memory (ROM), a Flash memory, a volatile or non-volatile memory, or other suitable memory units or storage units. At least a portion of Memory 120A may include data storage housed online on the cloud. Memory 120A may be or may include a plurality of different memory units. Memory 120A may store for example, instructions (e.g., code 125A) to carry out a method as disclosed herein. Memory 120A may use a datastore, such as a database.

Executable code 125A may be any application, program, process, task, or script. Executable code 125A may be executed by controller 105A possibly under control of operating system 115A. For example, executable code 125A may be, or may execute, one or more applications performing methods as disclosed herein, such as a machine learning model, or a process providing input to a machine learning model. In some embodiments, more than one computing device 100A or components of device 100A may be used. One or more processor(s) 105A may be configured to carry out embodiments of the present invention by for example executing software or code.

Storage 130A may be or may include, for example, a hard disk drive, a floppy disk drive, a compact disk (CD) drive, a universal serial bus (USB) device or other suitable removable and/or fixed storage unit. Data described herein may be stored in a storage 130A and may be loaded from storage 130A into a memory 120A where it may be processed by controller 105A. Storage 130A may include cloud storage. Storage 130A may include storing data in a database.

Input devices 135A may be or may include a mouse, a keyboard, a touch screen or pad or any suitable input device or combination of devices. Output devices 140A may include one or more displays, speakers and/or any other suitable output devices or combination of output devices. Any applicable input/output (I/O) devices may be connected to computing device 100A, for example, a wired or wireless network interface card (NIC), a modem, printer, a universal serial bus (USB) device or external hard drive may be included in input devices 135A and/or output devices 140A.

Embodiments of the invention may include one or more article(s) (e.g., memory 120A or storage 130A) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods disclosed herein.

Encrypted numbers in the CKKS scheme can be large (e.g., multiple hundreds of bits in size). Two known options for implementing the CKKS scheme on a modern computer system are as follows. First, CKKS may be implemented using a software library that provides multi-precision arithmetic and supports large numbers directly. Second, CKKS may be implemented using a technique called multi-modular arithmetic. The multi-modular arithmetic technique, also known as a residue number system (RNS), can involve representing relatively large numbers (e.g., 65-bit or greater) as a set of relatively smaller (e.g., 64-bit) numbers, and performing operations on these small numbers directly.

Multi-precision arithmetic can incur a significant computational overhead for one or more operations between large numbers. Since small (e.g., 64-bit) numbers typically fit into a native word size of modern computers, RNS based implementations of CKKS may achieve order-of-magnitude performance improvements compared to the multi-precision implementations and can be preferred for most practical applications.

Lattice cryptography in an RLWE setting can work on integer numbers. However, CKKS is typically intended to be used with real numbers. To support real numbers in RLWE, embodiments of the invention can scale real numbers up and/or use fixed-precision arithmetic. For example, real number 1.2345 may be scaled up by $\Delta=10^6$ and become 1234500. The number $\Delta$ used to scale up by is called the scaling factor; according to some embodiments, all operations are performed on numbers scaled-up by $\Delta$, and the result is scaled back down by $\Delta^{-1}$ to return to the original real domain. For example, according to some embodiments, after encoding and encryption, a vector of real numbers $[m_1, m_2, \ldots, m_N]$ becomes a vector of integer numbers $[\Delta m_1+e_1, \Delta m_2+e_2, \ldots, \Delta m_N+e_N]$. In other words, even though encryption noise $e_i$ is added for security, it is treated as a small error incurred on the underlying data.

Embodiments of the invention may reduce noise growth (e.g., accumulation of errors) in homomorphically encrypted data. Noise growth may be understood by the following example, where given two numbers $\Delta m_1+e_1$ and $\Delta m_2+e_2$, their product typically has considerably more noise than each number individually: $(\Delta m_1+e_1)(\Delta m_2+e_2)=\Delta^2 m_1 m_2+e$, where the noise is $e=\Delta m_1 e_2+\Delta m_1 e_1+e_1 e_2$ with $e \gg e_i$ because $\Delta m_i \gg e_i$. If noise growth is not controlled in some way, a series of successive multiplications can make noise exponentially larger and corrupt the least significant bits of the intended result of the computation. Corrupting the least significant bits of the intended results can result in an inaccurate decryption.

Encryption noise growth (e.g., exponential encryption noise growth) may be prevented by using a rescaling operation which can reduce the accumulated error and/or render noise growth linear instead of exponential.

An example of a conventional rescaling operation which takes a ciphertext c and rescales it to a ciphertext c' is given in EQN. 1 as shown below:

$$c' = \lfloor 2^{-p} \cdot c \rceil \left(\bmod \frac{Q_l}{2^p}\right) \qquad \text{EQN. 1}$$

In EQN. 1, the scaling factor $\Delta=2^p$, the notation $\lfloor * \rceil$ means to take the nearest integer value, and $Q_{l'}=\Delta^{l'}=2^{l \cdot p}$ is the ciphertext modulus.

As an example, if c is an encryption of $\Delta^2 m_1 m_2$, then c' will be a valid encryption of message $\Delta m_1 m_2$.

Since rescaling according to EQN. 1 can involve a division by $\Delta=2^p$, it can eliminate p least significant bits of c. These least significant bits can contain the encryption error et described above, and so the effect of rescaling can be to greatly reduce the accumulated error in a ciphertext. Some error survives the rescaling operation, but the overall result is that error increases linearly with every multiplication and not exponentially. A side effect of the rescaling operation is that the ciphertext modulus decreases by $2^p$, and therefore only l rescaling operations may be performed on a freshly encrypted ciphertext. This value l may be referred to as the corresponding "level" of the ciphertext.

FIG. 2 is a flowchart of a method 200 for reducing (e.g., via computing device 100A shown in FIG. 1 herein) noise in homomorphic operations on ciphertext data, according to some embodiments of the invention.

According to some embodiments, method 200 includes receiving a plurality of ciphertexts, wherein each ciphertext has a corresponding level of a plurality of levels (Step 202).

The ciphertexts may be encrypted using homomorphic encryption schemes known in the art. A corresponding level of a ciphertext may quantify how many homomorphic operations, such as homomorphic multiplication, have been performed on that ciphertext. A corresponding level of a ciphertext may decrease after each homomorphic operation performed on that ciphertext.

According to some embodiments, method 200 includes receiving (e.g., via computing device 100A shown in FIG. 1) data specifying a homomorphic multiplication operation to be performed on two ciphertexts of the plurality of ciphertexts (Step 204). It will be appreciated by one skilled in the art that method 200 may also be applicable to homomorphic multiplication operations for more than two ciphertexts: for example for three ciphertexts a, b, c the result a·b may be calculated according to embodiments of the invention and then the result may be multiplied by c, again according to embodiments of the invention.

The homomorphic multiplication operation may be, for example, EvalMult, and may multiply the two (or more) ciphertexts together.

According to some embodiments, method 200 includes, for two ciphertexts having different corresponding levels, adjusting a scaling factor of a first ciphertext of the two ciphertexts so that the respective scaling factors of the two ciphertexts are the same (Step 206).

A scaling factor of a ciphertext may be received as part of metadata of the plurality of ciphertexts. The scaling factor of a ciphertext may differ between ciphertexts of the plurality of ciphertexts: for example a first ciphertext may have a first scaling factor and a second ciphertext may have a second scaling factor.

According to some embodiments, the step (e.g., Step 206) of adjusting the scaling factor of the first ciphertext of the two ciphertexts includes adjusting the scaling factor of the ciphertext with a highest corresponding level among corresponding levels of the two ciphertexts. For example, in a homomorphic operation (e.g., a multiplication) between a first ciphertext having a first scaling factor at level 5 of the plurality of levels and a second ciphertext having a second scaling factor at level 3 of the plurality of levels, embodiments of the invention can involve adjusting the first scaling factor because in this example, this scaling factor belongs to the ciphertext having the higher corresponding level among the two ciphertexts involved in the operation.

According to some embodiments, for two ciphertexts having different corresponding levels, method 200 includes performing the specified homomorphic multiplication operation on the adjusted first ciphertext (e.g., adjusted according to Step 206) and the second ciphertext (e.g., the ciphertext with unadjusted scaling factor) of the two ciphertexts (Step 208).

According to some embodiments, for two ciphertexts having different corresponding levels, method 200 includes rescaling a result of the specified homomorphic multiplication operation (Step 210).

In some embodiments, a modified rescaling operation as described above in EQN. 1 is performed. A modification may be beneficial because, for example, in the CKKS-RNS scheme all moduli of the RNS can be prime numbers and can be different. In some embodiments, rescaling can occur by dividing the modulus $Q_l$ by something other than $2^p$ every time. To approximate the effect of the CKKS-MP rescaling operation in CKKS-RNS, in some embodiments, the prime RNS moduli is picked to be as close to $2^p$ as possible (e.g., using techniques described in detail herein.) Given this choice of moduli, the rescaling operation in CKKS-RNS may be, for example, described below in EQN. 2:

$$c' = \lfloor q_l^{-1} \cdot c \rceil \left(\bmod \frac{Q_l}{q_l}\right) \qquad \text{EQN. 2}$$

In EQN. 2, $Q_l = \Pi_{i=0}^{l} q_i$ is the ciphertext modulus, which is the product of all prime numbers $q_i$ that comprise the RNS system. The RNS system and constituent primes may be generated by methods disclosed herein, for example using pseudocode as shown in Table 2 below corresponding to method 300 shown in FIG. 3.

Since the ciphertext modulus $Q_l$ may not be a power of the scaling factor $\Delta$, it may not be possible to divide by $\Delta=2^p$ every time a rescaling is to be performed. Instead, a division by prime $q_i$ can be performed, which can be different (e.g., a different $q_i$ having different index i) every additional time a rescaling is performed on a given ciphertext. This can result in a rescaling in RNS incurring an approximation error to c'; instead of, for example, being an encryption of $\Delta m_1 m_2$, c' it can be an encryption of $$\frac{\Delta^2}{q_l} m_1 m_2 = f \cdot \Delta m_1 m_2,$$

where f is a factor equal to $$\frac{\Delta}{q_l}.$$

CKKS-RNS can have smaller approximation error when the factor is closer to 1, i.e., when $q_l$ is chosen to be as close to A as possible. However, in most practical settings, it may not be possible to select $q_i$'s that are all very close to A and the rescaling approximation error of CKKS-RNS is generally larger than the encryption noise in a ciphertext. Therefore, even though CKKS-RNS can be faster than CKKS-MP, it typically incurs larger error, making it, for example, unsuitable for computations that require a high degree of precision. Like the non-RNS version, the number of rescale operations is limited by the number of primes comprising $Q_l$. The number of primes comprising $Q_l$ (e.g., in the product $Q_l = \Pi_{i=0}^{l} q_i$) can be referred to the "number of towers in $Q_l$", and a ciphertext with modulus $Q_l$ is can be at level l and can have all towers, a ciphertext with modulus $Q_{l-1}$ can be at level l-1 and can have one tower less, and so on.

The rescaling operation of Step 210 may be a rescaling operation as described by, for example, EQN. 2.

According to some embodiments, for two ciphertexts having the same corresponding levels, method 200 includes performing the specified homomorphic multiplication operation on the two or more ciphertexts (Step 212). In other words, for homomorphic operations (e.g., multiplication) between ciphertexts belonging to the same level, no adjustment of the respective scaling factors may be necessary prior to performing the operation. The scaling factors may be recorded (e.g., stored in memory 120A or storage 130A of computing device 100A shown in FIG. 1) for later use, such as during decryption.

According to some embodiments, for two ciphertexts having the same corresponding levels, method 200 includes rescaling a result of the specified homomorphic multiplication operation (Step 214). The rescaling operation may be a rescaling operation as described by, for example, EQN. 2.

According to some embodiments, for two ciphertexts having the same corresponding levels, method 200 includes using the scaling factors of the two ciphertexts during a decryption process (Step 216).

The scaling factors may have been recorded, e.g., stored in memory 120A or storage 130A shown in FIG. 1A, for later adjustment of the result of the operation during decryption, and may thereby, for example, reduce a noise in the result.

A benefit of embodiments of the invention can be that factor f may not depend on the encrypted data. Instead, the factor f can be a function of the scaling factor Δ of a ciphertext, and the moduli $q_i$ can be selected to setup the RNS system. Therefore, it can be possible to compute factor f and/or use EvalMult to homomorphically multiply the ciphertext by $a_{adj} = \Delta/f$ to adjust its scaling factor back to the one originally intended of A. In these embodiments, the approximation error of rescaling can be cancelled, and CKKS-RNS-EXACT rescaling can become as accurate (or almost as accurate) as CKKS-MP (e.g., some rounding error may still exist but is minimal compared to the unadjusted approximation error of CKKS-RNS).

However, using EvalMult after every rescale operation may have disadvantages. The result of EvalMult can be rescaled in order to, for example, prevent noise growth, which can imply that the depth of the computation can also be increased.

In some embodiment, instead of performing EvalMult after every rescale, a correct scaling factor can be kept track of (e.g., by recording or storing the scaling factor in a memory or storage, such as memory 120A or storage 130A of computing device 100A shown in FIG. 1) and used when decrypting (e.g., as described in Step 216). This may ensure an accurate result, without having to perform an additional rescale operation during the computation. However, even when using this approach, there may still some cases where scaling factors are adjusted. Operations between ciphertexts with different scaling factors (e.g., because the ciphertext has previously been involved in an operation and is at a different associated level) may not work, unless it is ensured their scaling factors match. In some embodiments, keeping track of scaling factors can be desirable over adjusting after every rescale operation (e.g., operations between ciphertexts of the same scaling factor, even if that scaling factor is not the original Δ).

To increase the occasions where the scaling factors of ciphertexts match, embodiments of the invention can include ciphertexts of a given level sharing the same scaling factor. To maintain this invariant, two measures can be taken.

The first measure taken can include for setting up scaling factors of each level to follow the "natural" order of rescale operations. For instance, if the scaling factor at level l (e.g., when no rescale operation has been performed) is Δ, the scaling factor of level l-1 (e.g., after one rescale operation) is $\Delta^2/q_l$. It should be noted that this can be exactly the same scaling factor obtained if a rescale operation is performed after a multiplication of two ciphertexts of the same level l. Table 1 illustrates an example of the scaling factors of a computation that involves five levels (e.g., l=5). Note that setting $\Delta = q_l$ can avoid error altogether for the first rescaling operation.

TABLE 1

| Level | Prime tower dropped with rescaling | Scaling factor | Scaling factor after multiplication |
|---|---|---|---|
| 5 | $q_5$ | $\Delta = q_5$ | $\Delta^2$ |
| 4 | $q_4$ | $\Delta^2/q_5 = q_5$ | $\Delta^4/q_5^2$ |
| 3 | $q_3$ | $\Delta^4/q_5^2 \cdot q_4$ | $\Delta^8/q_5^4 \cdot q_4^2$ |
| 2 | $q_2$ | $\Delta^8/q_5^4 \cdot q_4^2 \cdot q_3$ | $\Delta^{16}/q_5^8 \cdot q_4^4 \cdot q_3^2$ |
| 1 | N/A | $\Delta^{16}/q_5^8 \cdot q_4^4 \cdot q_3^2 \cdot q_2$ | $\Delta^{32}/q_5^{16} \cdot q_4^8 \cdot q_3^4 \cdot q_2^2$ |

The second measure taken can be to enforce the correct order of rescale operations, by performing them, for example, automatically after every multiplication. Users are typically not responsible for calling the rescale method themselves—the CKKS-RNS-EXACT implementation can perform both rescaling and scaling factor adjustment.

According to some embodiments, when ciphertexts are at different levels (e.g., have different scaling factors) the scaling factor of at least one ciphertext is adjusted so that each respective scaling factor among the ciphertexts is the same. For example, if ciphertext $c_1$ is at level k and ciphertext $c_2$ is at level k-i, then embodiments of the invention adjust their scaling factors so that they match before performing the specified homomorphic operation (e.g., multiplication). There is no need to adjust both scaling factors:

one scaling factor can be adjusted to match the scaling factor of the other. According to some embodiments, the scaling factor of the ciphertext that has the higher level is adjusted. By doing so, the "natural" scaling factor order is maintained and avoids incurring an extra level in the overall computation.

Thus, according to some embodiments, for two ciphertexts encrypting numbers $SF_k m_1$ and $SF_{k-i} m_2$, EQN. 4 describes how to perform an adjustment on the scaling factor of $SF_k m_1$.

$$\text{Rescale } (EvalMult(SF_k m_1, a_{adj})) = \text{Rescale } (a_{adj} \cdot SF_k^2 m_1) = a_{adj} \cdot \frac{SF_k^2}{q_k} m_1 \quad \text{EQN. 4}$$

The procedure according to Equation 4 is to first multiply the ciphertext with the adjustment factor $a_{adj}$ and then rescale by dropping tower $q_k$.

Since the term $$a_{adj} \cdot \frac{SF_k^2}{q_k} m_1$$

should match the scaling factor of $SF_{k-i}$ of the other ciphertext, this implies that the adjustment factor $a_{adj}$ is given as:

$$a_{adj} = \frac{q_k \cdot SF_{k-i}}{SF_k^2} \quad \text{EQN. 5}$$

It should be noted that if instead of $SF_{k-i}$ the second ciphertext had a scaling factor of $SF_{k-i}^2$ (e.g. because a different encoding was used), then embodiments of the invention would perform the adjustment without the rescale operation, for example as:

$$EvalMult(SF_k m_1, a_{adj}) = a_{adj} \cdot SF_k^2 m_1 \quad \text{EQN. 6}$$

In such a case the adjustment factor becomes:

$$a_{adj} = \frac{SF_{k-i}^2}{SF_k^2} \quad \text{EQN. 7}$$

One or more embodiments of the invention relate to a method for selecting the prime towers $q_i$ of the RNS system for the CKKS-RNS-EXACT scheme.

Figure 3:
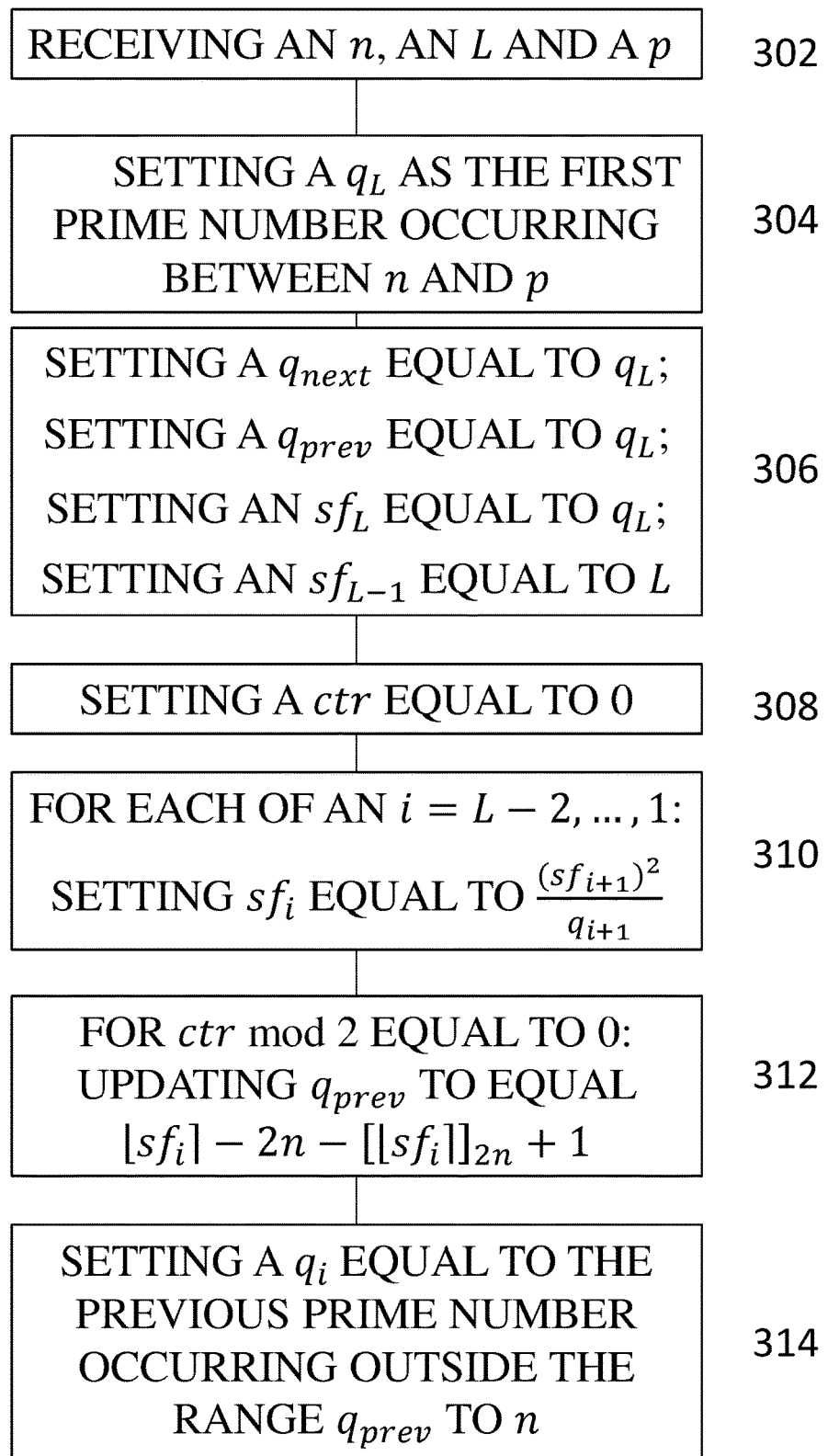
FIG. 3 is a flowchart of a method, according to some embodiments of the invention.
Figure 3:
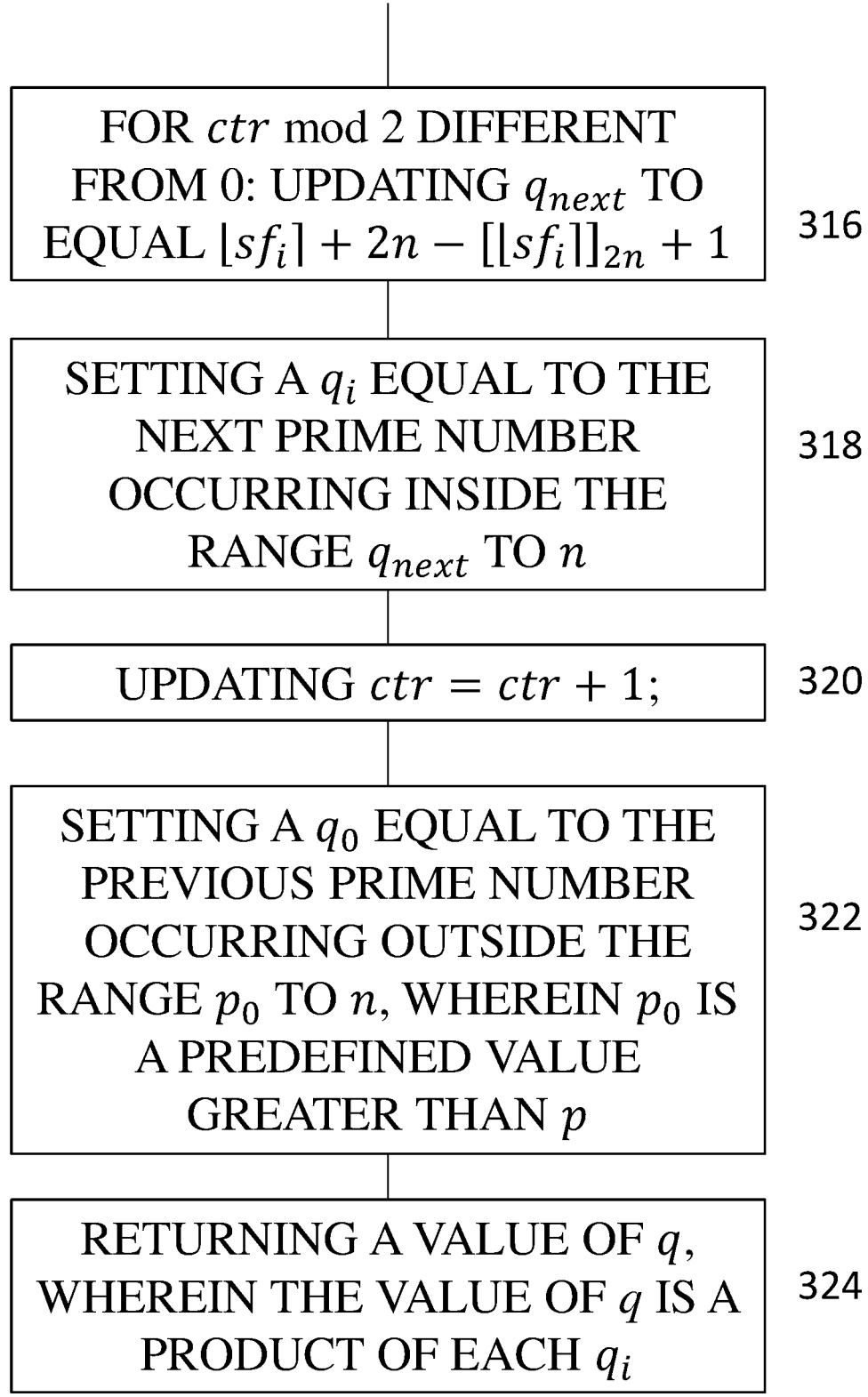

FIG. 3 is a flowchart of a method 300 for choosing residue number system moduli, according to some embodiments of the invention. Method 300 may be performed, for example, by a computing device such as computing device 100A shown in FIG. 1.

According to some embodiments, method 300 includes receiving an n, an L and a p (Step 302). The received n, L and p may be natural numbers, and may be selected by a user based on the needs of the application.

According to some embodiments, method 300 includes setting a $q_L$ as the first prime number occurring between n and p (Step 304). The first prime number may be determined using a known function, such as a FirstPrime(a,b) function which determines the first prime number in the range a to b.

According to some embodiments, method 300 includes setting a $q_{next}$ equal to $q_L$, setting a $q_{prev}$ equal to $q_L$, setting an $sf_L$ equal to $q_L$, and setting an $sf_{L-1}$ equal to $q_L$ (Step 306). This step may represent an initialization step, preparing parameter values which may later be updated.

According to some embodiments, method 300 includes setting a ctr equal to 0 (Step 308). The parameter ctr may represent a counter, counting a number of iterations.

According to some embodiments, method 300 includes looping for each of an i=L−2, . . . , 1 and setting $sf_i$ equal to $$\frac{(sf_{i+1})^2}{q_{i+1}}$$

(Step 310).

According to some embodiments, whilst still in the for loop for i=L−2, . . . , 1, method 300 includes, for the case where ctr mod 2 equals zero, updating $q_{prev}$ to equal $\lfloor sf_i \rceil - 2n - \lfloor \lfloor sf_i \rceil \rfloor_{2n} + 1$ (Step 312). As used herein, the notation $[*]_{2n}$ denotes taking the $2n^{th}$ root of the sum of the vector elements, each vector element raised to the $2n^{th}$ power.

According to some embodiments, whilst still in the for loop for i=L−2, . . . , 1, and still for the case where ctr mod 2 equals zero, method 300 includes setting a $q_i$ equal to the previous prime number occurring outside the range $q_{prev}$ to n (Step 314). The previous prime number may be determined using a known function, such as a PreviousPrime(a,b) function which determines the previous prime number outside the range a to b.

According to some embodiments, whilst still in the for loop for i=L−2, . . . , 1, method 300 includes, for the case where ctr mod 2 is not equal to (e.g., different from) zero, updating $q_{next}$ to equal $\lfloor sf_i \rceil + 2n - \lfloor \lfloor sf_i \rceil \rfloor_{2n} + 1$ (Step 316).

According to some embodiments, whilst still in the for loop for i=L−2, . . . , 1, and still for the case where ctr mod 2 is different from zero, method 300 includes setting a $q_i$ equal to the next prime number occurring inside the range $q_{next}$ to n (Step 318). The next prime number may be determined using a known function, such as a NextPrime (a,b) function which determines the next prime number inside the range a to b.

According to some embodiments, after each i in the loop is considered, method 300 may include updating ctr=ctr+1, in other words increasing a value of the counter after each iteration.

According to some embodiments, method 300 includes setting a $q_0$ equal to the previous prime number occurring outside the range $p_0$ to n, wherein $p_0$ is a predefined value greater than p (Step 322).

The value $p_0$ may represent a word length (e.g., based on a native word length of a computer processor) for efficient modular operations predefined by the user. For example, in embodiments which use PALISADE (an open-source cross platform software library that provides implementations of lattice cryptography building blocks and homomorphic encryption schemes), $p_0$ maybe set equal to 60, because for 64-bit native words, PALISADE supports efficient modular operations up to 60 bits.

According to some embodiments, method 300 includes returning a value of q, wherein the value of q is a product of each $q_i$ (Step 324), e.g. $q = \Pi_{i=0}^{L-2} q_i$. The value q may therefore be the modulus of the RNS system.

Ciphertexts used in some embodiments may be encrypted using the RNS system produced by method 300. For example, the ciphertexts of method 200 may be encrypted using the RNS system of moduli generated by method 300.

Table 2 shows example pseudocode for choosing residue number system moduli, according to some embodiments of the invention, for example, method 300.

TABLE 2

```
SelectModuli(n, l, p, p₀)
q_l := FirstPrime(p, n)
q_next := q_l
q_prev := q_l
SF_l := q_l; SF_{l-1} := q_l
ctr := 0
   for i = l - 2, l - 3, ... , 1
       SF_i := (SF_{i+1})² / q_{i+1}
       if ctr mod 2 = 0
           q_prev = ⌊SF_i⌋ - 2n - [⌊SF_i⌋]_{2n} + 1
           q_t := PreviousPrime(q_prev, n)
       else
           q_prev = ⌊SF_i⌋ + 2n - [⌊SF_i⌋]_{2n} + 1
           q_t = NextPrime(q_next, n)
       ctr := ctr + 1
   q_0 := PreviousPrime(p_0, n)
   return q
```

Table 3 shows example scaling factors obtained using the recursion relation described in EQN. 3, if (i) a conventional moduli selection algorithm and (ii) a moduli selection algorithm according to embodiments of the invention is used. The example is for an RNS system with 30 primes, in other words 30 levels of homomorphic computation.

TABLE 3

| Level | Scaling factors (Conventional) | Ratio to q30 (Conventional) | Scaling factors (Embodiments) | Ratio to q30 (Embodiments) |
|---|---|---|---|---|
| 30 | 1125899908022270 | 1 | 1125899908022270 | 1 |
| 20 | 1125901149538390 | 1.000001103 | 1125899919034520 | 1.00000001 |
| 10 | 1127173721789190 | 1.001131374 | 1125899946195380 | 1.000000034 |
| 0  | 3583898673668410 | 3.183141457 | 1125902283235330 | 1.00000211 |

It can be observed that, even though the first scaling factor (e.g., at level 30) is the same for both algorithms, the subsequent scaling factors can be different to the point that the final scaling factor for the conventional moduli selection algorithm is about three times larger than the original scaling factor and the scaling factor obtained using the moduli selection algorithm.

Having diverging scaling factors (e.g., becoming much larger or smaller than the original) can be a problem because precision may be eventually lost, for example, by underflow (e.g., if the scaling factors become too small), or overflow (e.g., if they become too large). The moduli selection algorithm according to embodiments of the invention enables the use of CKKS-RNS-EXACT for deeper computations.

One or more embodiments of the invention relate to a system the system comprising at least one processor (e.g., processor/controller 105A shown in FIG. 1) and a memory (e.g., memory 120A shown in FIG. 1) containing instructions (e.g., executable code 125A shown in FIG. 1) which, when executed by the at least one processor, cause the at least one processor to carry out methods described herein.

Figure 4:
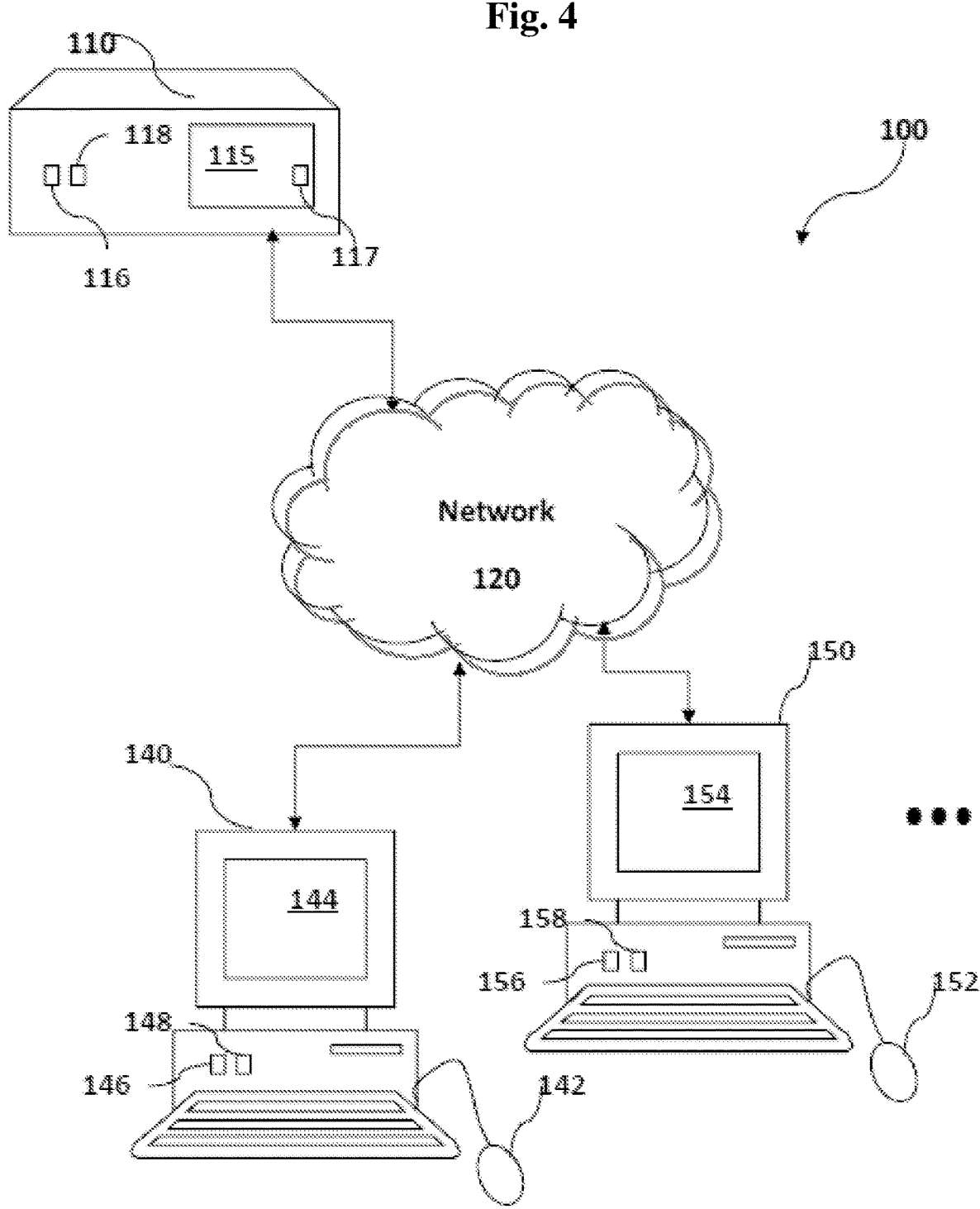
FIG. 4 is schematic drawing of a system, according to some embodiments of the invention.

FIG. 4 is a schematic drawing of a system 100 according to some embodiments of the invention. System 100 may include one or more server(s) 110, database(s) 115, and/or computer(s) 140, 150, . . . , etc. Any or all of system 100 devices may be connected via one or more network(s) 120. Network 120, which connects server(s) 110 and computers 140 and 150, may be any public or private network such as the Internet. Access to network 120 may be through wire line, terrestrial wireless, satellite or other systems well known in the art.

Server(s) 110 and computers 140 and 150, may include one or more controller(s) or processor(s) 116, 146, and 156, respectively, for executing operations according to embodiments of the invention and one or more memory unit(s) 118, 148, and 158, respectively, for storing data (e.g., encryption and/or decryption keys, and encrypted and/or decrypted data) and/or instructions (e.g., software for applying computations or calculations, keys to encrypt or decrypt data according to embodiments of the invention) executable by the processor(s). Processor(s) 116, 146, and/or 156 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 118, 148, and/or 158 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Computers 140 and 150 may be servers, personal computers, desktop computers, mobile computers, laptop computers, and notebook computers or any other suitable device such as a cellular telephone, personal digital assistant (PDA), video game console, etc., and may include wired or wireless connections or modems. Computers 140 and 150 may include one or more input devices 142 and 152, respectively, for receiving input from a user (e.g., via a pointing device, click-wheel or mouse, keys, touch screen, recorder/microphone, other input components). Computers 140 and 150 may include one or more output devices 144 and 154 (e.g., a monitor or screen) for displaying data to a user provided by or for server(s) 110.

Database 115 may include software processes or applications for storing and retrieving data 117 such as large-word data structures and large-work CKKS computations, and/or encryption and/or decryption keys. Data 117 may also include code (e.g., software code) or logic, e.g., to enable the application of large-work CKKS algorithms according to embodiments of the invention. Database 115 may be internal or external to one or more of server(s) 110 and/or computer(s) 140 and/or 150 (not shown) and may be connected thereto by a local or remote and a wired or wireless connection. In some embodiments, data 117 is stored in an alternate location separate from database 115, e.g., memory unit(s) 118, 148, and/or 158.

Any of system 100 devices may operate as a secure or insecure party. Secure parties may each securely store unencrypted (or encrypted) data and private keys associated with each dataset, party, etc. Insecure parties may not access the unencrypted data or private keys.

Unless specifically stated otherwise, as apparent from the foregoing discussion, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention may include an article such as a computer or processor readable non-transitory storage medium, such as for example a memory, a disk drive, or a USB flash memory encoding, including, or storing instructions, e.g., computer-executable instructions, which when executed by a processor or controller, cause the processor or controller to carry out methods disclosed herein.

It should be recognized that embodiments of the invention may solve one or more of the objectives and/or challenges described in the background, and that embodiments of the invention need not meet every one of the above objectives and/or challenges to come within the scope of the present invention. While certain features of the invention have been particularly illustrated and described herein, many modifications, substitutions, changes, and equivalents may occur to those of ordinary skill in the art. It is, therefore, to be understood that the appended claims are intended to cover all such modifications and changes in form and details as fall within the true spirit of the invention.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures, and examples.

It is to be understood that the details set forth herein do not construe a limitation to an application of the invention.

Furthermore, it is to be understood that the invention may be carried out or practiced in various ways and that the invention may be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps, or integers.

If the specification or claims refer to "an additional" element, that does not preclude there being more than one of the additional elements.

It is to be understood that where the claims or specification refer to "a" or "an" element, such reference is not to be construed that there is only one of that element.

It is to be understood that where the specification states that a component, feature, structure, or characteristic "may", "might", "may" or "could" be included, that a particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for reducing noise in homomorphic multiplication operations on ciphertext data, the method comprising:

receiving a plurality of ciphertexts, wherein each ciphertext has a corresponding level of a plurality of levels;

receiving data specifying a homomorphic multiplication operation to be performed on two ciphertexts of the plurality of ciphertexts;

for two ciphertexts having different corresponding levels:

adjusting a scaling factor of a first ciphertext of the two ciphertexts so that the respective scaling factors of the two ciphertexts are the same;

performing the specified homomorphic multiplication operation on the adjusted first ciphertext and a second ciphertext of the two ciphertexts; and rescaling a result of the specified homomorphic multiplication operation;

for two ciphertexts having the same corresponding levels:

performing the specified homomorphic multiplication operation on the two ciphertexts;

rescaling a result of the specified homomorphic multiplication operation; and using the scaling factors of the two ciphertexts during a decryption process, wherein the scaling factor of a ciphertext having corresponding level i of the plurality of levels is given by $SF_i$ and the scaling factor of level i−1 is defined recursively as $$SF_{i-1} = \frac{SF_i^2}{q_i}$$

wherein the $q_i$ are the prime towers of a residue number system (RNS) used in an encryption of the ciphertext.

2. The method of claim 1, wherein the step of adjusting a scaling factor of a first ciphertext of the two ciphertexts comprises adjusting the scaling factor of the ciphertext with the highest corresponding level among corresponding levels of the two ciphertexts.

3. The method of claim 1, wherein $SF_l$, the scaling factor of the highest corresponding level l, is equal to $2^p$ for some predefined $p \in \mathbb{Z}$.

4. The method of claim 1, wherein $SF_l$, the scaling factor of the highest corresponding level l, is equal to $q_l$.

5. The method of claim 1, wherein adjusting the scaling factor of the first ciphertext of the two ciphertexts comprises multiplying the first ciphertext by an adjustment factor, wherein the adjustment factor $a_{adj}$ for scaling factor $SF_k$ is equal to:

$$a_{adj} = \frac{q_k \cdot SF_{k-i}}{SF_k^2}$$

when k−i is the corresponding level of the second ciphertext of the two ciphertexts.

6. The method of claim 1, wherein rescaling a resulting ciphertext of the specified homomorphic multiplication operation is performed using a rescaling operation given by $$c' = \lfloor q_l^{-1} \cdot c \rfloor \left( \bmod \frac{Q_l}{q_l} \right)$$

wherein c is a resulting ciphertext of the specified homomorphic multiplication operation to be rescaled, c' is a rescaled ciphertext, and $Q_l = \Pi_{i=0}^{i} q_i$ is a ciphertext modulus, which is a product of all prime numbers $q_i$ that comprise a residue number system (RNS) used in an encryption of the plurality of ciphertexts.

7. A system for reducing noise in homomorphic multiplication operations on ciphertext data, the system comprising at least one processor and a memory containing instructions which, when executed by the at least one processor, cause the at least one processor to:
  receive a plurality of ciphertexts, wherein each ciphertext has a corresponding level of a plurality of levels;
  receive data specifying a homomorphic multiplication operation to be performed on two ciphertexts of the plurality of ciphertexts;
  for two ciphertexts having different corresponding levels:
    adjust a scaling factor of a first ciphertext of the two ciphertexts so that the respective scaling factors of the two ciphertexts are the same;
    perform the specified homomorphic multiplication operation on the adjusted first ciphertext and a second ciphertext of the two ciphertexts; and
    rescale a result of the specified homomorphic multiplication operation;
  for two ciphertexts having the same corresponding levels:
    perform the specified homomorphic multiplication operation on the two ciphertexts;
    rescale a result of the specified homomorphic multiplication operation; and
    use the scaling factors of the two ciphertexts during a decryption process
  wherein the scaling factor of a ciphertext having corresponding level i of the plurality of levels is given by $SF_i$ and the scaling factor of level i−1 is defined recursively as $$SF_{i-1} = \frac{SF_i^2}{q_i}$$

wherein the $q_i$ are the prime towers of a residue number system (RNS) used in an encryption of the ciphertext.

8. The system of claim 7, wherein the processor is configured to adjust the scaling factor of the ciphertext with the highest corresponding level among corresponding levels of the two ciphertexts.

9. The method of claim 7, wherein $SF_l$, the scaling factor of the highest corresponding level l, is equal to $2^p$ for some predefined $p \in \mathbb{Z}$.

10. The method of claim 7, wherein $SF_l$, the scaling factor of the highest corresponding level l, is equal to $q_l$.

11. The method of claim 7, wherein adjusting the scaling factor of the first ciphertext of the two ciphertexts comprises multiplying the first ciphertext by an adjustment factor, wherein the adjustment factor $a_{adj}$ for scaling factor $SF_k$ is equal to:

$$a_{adj} = \frac{q_k \cdot SF_{k-i}}{SF_k^2}$$

when k−i is the corresponding level of the second ciphertext of the two ciphertexts.

12. The system of claim 7, wherein the processor is configured to rescale a resulting ciphertext of the specified homomorphic multiplication operation using a rescaling operation given by $$c' = \lfloor q_l^{-1} \cdot c \rfloor \left( \bmod \frac{Q_l}{q_l} \right)$$

wherein c is a resulting ciphertext of the specified homomorphic multiplication operation to be rescaled, c' is a rescaled ciphertext, and $Q_l = \Pi_{i=0}^{i} q_i$ is a ciphertext modulus, which is a product of all prime numbers $q_l$ that comprise a residue number system (RNS) used in an encryption of the plurality of ciphertexts.

* * * * *